US009188698B2

(12) United States Patent
Tashiro et al.

(10) Patent No.: US 9,188,698 B2
(45) Date of Patent: Nov. 17, 2015

(54) EXPANDABLE DOWNHOLE TOOL

(75) Inventors: Hitoshi Tashiro, Kamakura (JP); Jahir Pabon, Newton, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 12/412,360

(22) Filed: Mar. 27, 2009

(65) Prior Publication Data

US 2009/0242317 A1 Oct. 1, 2009

Related U.S. Application Data

(60) Provisional application No. 61/040,127, filed on Mar. 27, 2008.

(51) Int. Cl.
*G01V 1/40* (2006.01)
*G01V 11/00* (2006.01)

(52) U.S. Cl.
CPC ......... *G01V 11/005* (2013.01); *Y10T 29/49826* (2015.01)

(58) Field of Classification Search
CPC .................. G01V 11/005; Y10T 29/49826
USPC ......... 181/102, 104, 105, 106, 108, 113, 121;
181/401; 340/15, 15.5; 367/27, 31, 35, 75,
367/86, 912; 324/367, 374; 29/428
See application file for complete search history.

(56) References Cited

U.S. PATENT DOCUMENTS

| 3,475,722 | A | * | 10/1969 | White | 367/31 |
| RE31,607 | E | * | 6/1984 | Vogel et al. | 367/86 |
| 4,549,630 | A | * | 10/1985 | Brown | 181/106 |
| 4,802,145 | A | * | 1/1989 | Mount, II | 367/35 |
| 6,173,606 | B1 | * | 1/2001 | Mosley | 73/152.16 |
| 7,187,620 | B2 | | 3/2007 | Nutt et al. | |
| 7,698,937 | B2 | * | 4/2010 | Neidhardt | 73/152.57 |
| 2002/0163857 | A1 | * | 11/2002 | Bahorich et al. | 367/14 |
| 2005/0087391 | A1 | * | 4/2005 | Ounadjela | 181/121 |
| 2009/0296086 | A1 | * | 12/2009 | Appel et al. | 356/326 |

OTHER PUBLICATIONS

"Torsional Log—The Impossible Dream?," J.E.White, The Log Analyst, May-Jun. 1991, pp. 242-245.
"Weak Elastic Anisotropy and the Tube Wave," Andrew N. Norris and Bikash K. Sinha, Geophysics, vol. 58, No. 8 (Aug. 1993), pp. 1091-1098.

* cited by examiner

*Primary Examiner* — Daniel L Murphy
(74) *Attorney, Agent, or Firm* — Daryl R. Wright; Jody DeStefanis

(57) ABSTRACT

A downhole tool, having a central axis defined, may selectively include a sensor section including one or more arms connected to the tool body with an open/close mechanism. The open/close mechanism is configured to move in a radial direction with respect to the axis of the tool body. The tool also includes at least one sensor attached to the arm, and the tool may include at least one transmitter section on the tool. The transmitter is configured to transmit acoustic energy to a formation.

16 Claims, 7 Drawing Sheets

EXPANDABLE DOWNHOLE TOOL

CROSS-REFERENCE TO RELATED APPLICATIONS

This application claims priority from U.S. Provisional Application Ser. No. 61/040,127 filed on Mar. 27, 2008, entitled "Expandable Sonic Logging Tool" in the names of Hitoshi Tashiro and Jahir Pabon, which is incorporated by reference in its entirety.

FIELD OF DISCLOSURE

Embodiments disclosed herein generally relate to methods and apparatus of a downhole tool. More specifically, embodiments disclosed herein relate to an expandable downhole tool designed for use within the oilfield industry.

BACKGROUND

In oilfield exploration and production operations, various logging techniques are employed to characterize and explore downhole formations. For example, in monopole, dipole or other multi-pole sonic logging, the measurement is usually taken with an array of sensors distributed circumferentially and axially along a tool body. These sensors each receive a signal sent from a transmitter. The transmitter can be located on a different section of the tool or on the surface. The transmitter sends the signal through the formation to the sensors in the tool.

The radial distance between opposite sensors distributed uniformly circumferentially is used as a fundamental parameter to determine the sensitivity of the measurement. The radial distance is determined by the diameter of the circle that the sensors form at a given tool axial location. Non-axis symmetry modes, such as dipole and quadrupole modes, are particularly sensitive to this parameter. A dipole field is generated by two opposite polarity sources a fixed distance apart. In this context, the magnitude of the dipole field propagating along the borehole can be measured with pairs of sensors located on opposite sides of the tool. Similarly, a quadrupole field involves four polarity sources, and in this context the magnitude of the quadrupole field involves four sensors equally spaced along the circumference of the circle that the sensors form at a given axial location.

An important factor determining the quality of the measured fields is noise suppression. Noise is generally unwanted. For instance noise may be generated due to direct interaction between tool hardware and borehole wall, or other random occurrences in the borehole in which this noise may be perceived by the sensors when measuring. Road noise suppression by both hardware design and processing are key challenges of tool configuration. Such noise generated by tool hardware tapping the borehole wall propagates inside of borehole often been seen as coherent energy wave as if it is signal comes through formation. Noise is typically minimized by avoiding tool from direct contact from borehole while measurement is in progress. Noise can also be suppressed through filtering and data processing means. For example, a dipole source transmits at a specific frequency, depends on borehole size and formation velocity, in sonic logging typically within 0.3 to 5 kilohertz, and the sensor then records all frequencies. However, because expected frequency and energy propagation mode is known, other signals of other frequencies and propagation mode can be filtered out during processing.

Referring now to FIG. 1, a typical variation of a peak amplitude of a dipole pressure field 130 across a borehole is shown. In this figure, the sensor locations of the circumferentially distributed sensors 120 are shown centered about the tool axis 100 and positioned away from the borehole wall 110. As can be seen, the amplitude of the dipole pressure field 130 drops when moving from a borehole wall 110 to the center of the borehole.

Referring now to FIG. 2, another variation of a dipole peak amplitude of a dipole pressure field 230 across a borehole is shown. With the same radial positioning of the sensors 220 about the tool axis 200, as with FIG. 1, and a larger borehole diameter, the distance between the sensors 220 and the borehole wall 210 is increased. As stated previously, the dipole pressure field 230 decreases when moving from the borehole wall 210 to the center of the borehole 200. Larger borehole diameters usually exist at the top of the well. As such, the formation shear speed is typically much slower than the mud speed. These conditions lead to the amplitude of a dipole pressure field dropping more rapidly moving from the borehole wall 210 to the center of the borehole 200.

Current wireline tools usually have an outer diameter smaller than four inches (making the radial distance between sensors even less). This limited radial separation of the sensors makes sonic logging difficult in large boreholes, especially at the top of the well. As shown in FIGS. 1 and 2, the smaller tool diameter to borehole diameter ratio results in smaller signals at the sensor locations. Additionally, it may be difficult to keep the tool centered in large diameter boreholes, in which tool eccentering may result in mode contamination of the received signal. For example, if the tool is centered in the borehole, a dipole logging signal may be obtained by subtracting the signals from two diametrically opposite sensors at a tool axial location. If the tool is eccentered, the subtraction will result in a certain amount of monopole signal. These "leaked" monopoles, typically known as Stoneley signals, hinder an accurate extraction of the formation shear speed from the recorded signal. Further, if more than two circumferential sensors are used to obtain the dipole pressure field, the mode "leakage" can be exacerbated.

A transmitter source is also typically constrained to fit within the outer diameter of the tool. As a result, a large portion of the acoustic energy excited by the transmitter may be lost in the mud surrounding the tool and within the casing, and thereby not exciting the borehole modes of interest. Like the sensor assembly, centering the transmitter source along the borehole axis may be difficult. Firing an eccentered transmitter generates unwanted modes. For example an eccentered dipole transmitter will excite a dipole field but will also excite monopole and other multi-pole fields in the borehole. Those unwanted modes make it harder to extract the originally wanted signal which is to be used to extract information on the rock. As such, there exists a need for a downhole tool to improve upon current tool eccentering and data accuracy.

SUMMARY

In one aspect, embodiments disclosed herein relate to a downhole tool body having an axis defined therethrough, and including at least one arm connected to the tool body with an open/close mechanism. The open/close mechanism is configured to move in a radial direction with respect to the axis of the tool body. The tool also includes at least one sensor attached to the arm, and the tool includes at least one transmitter on the tool. The at least one transmitter is configured to excite the borehole rock, and the at least one sensor is configured to measure the signal that propagates through the rock due to the excitation from the transmitter.

In another aspect, embodiments disclosed herein relate to a method of monitoring a formation downhole. The method includes disposing a tool downhole, with an axis defined therethrough, and moving an arm attached to the tool in a radial direction with respect to the axis of the tool body via an open/close mechanism. The method also includes transmitting a signal, with a transmitter disposed upon the tool, into the formation and receiving the signal with a sensor disposed upon the arm of the downhole tool.

In another aspect, embodiments disclosed herein relate to a method of manufacturing a downhole tool. The method includes attaching at least one movable arm onto a tool body, the tool body having an axis defined therethrough, and the arm configured to move in a radial direction with respect to the axis via an open/close mechanism. The tool also includes at least one sensor on the arm and a transmitter. The transmitter and sensor are configured to communicate with each other.

Other aspects and advantages of the invention will be apparent from the following description and the appended claims.

DETAILED DESCRIPTION

Figure 1:
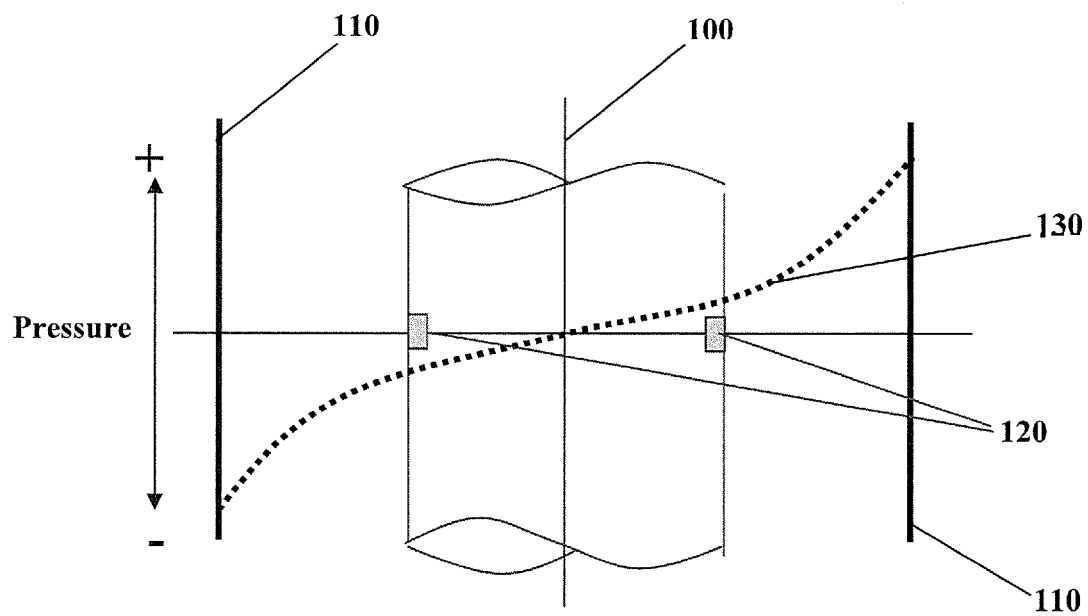
FIG. 1 shows a profile of peak amplitude of a pressure profile across a borehole.
Figure 2:
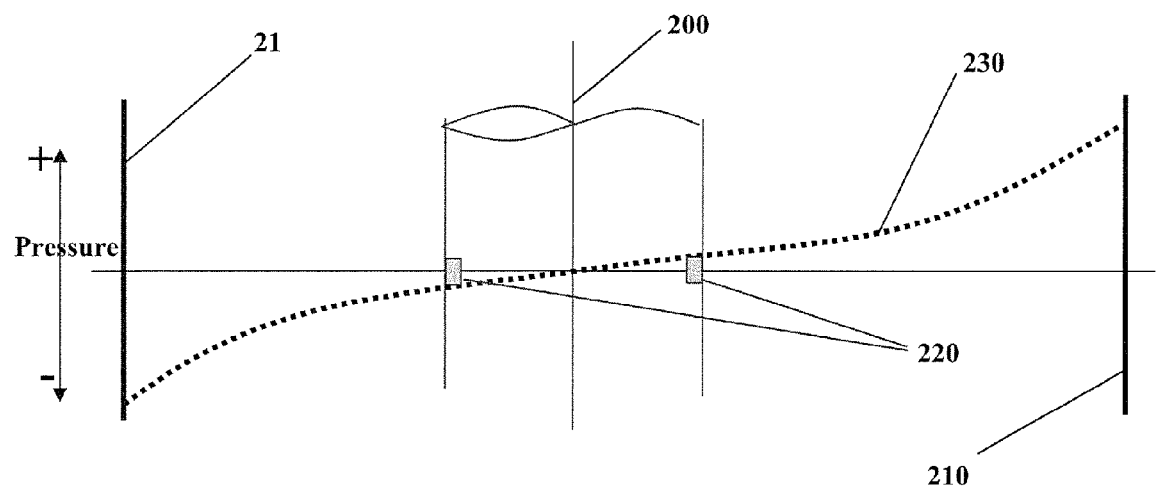
FIG. 2 shows another profile of peak amplitude of a pressure profile across a borehole.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description.

In one aspect, embodiments disclosed herein generally relate to an expandable wireline downhole tool. The tool may have multiple arms disposed in a circular array about the tool, in which each arm may have one or more sensors disposed therein. The arms (or sleds) may be pushed outwards against a borehole wall during logging to have the sensors disposed adjacent to the borehole wall and/or the tool body centered in the borehole. The tool may also have a transmitter assembly designed to excite different modes of the borehole, for example, monopole, dipole, quadrupole, borehole torsional vibration modes. The mechanism may also be configured in accordance with embodiments described in U.S. Patent Application Publication US2005/0087391, herein incorporated by reference. In one embodiment, the transmitter assembly may include a circular array of expandable arms with transducers mounted or disposed thereon. As such, the tool may be used to excite multi-pole modes of the borehole. Further, in another embodiment, a transducer disposed on the tool may be vibrationally coupled to the borehole wall by having vibration propagate through one or more expandable arms of the tool.

Figures 3A, 3B:
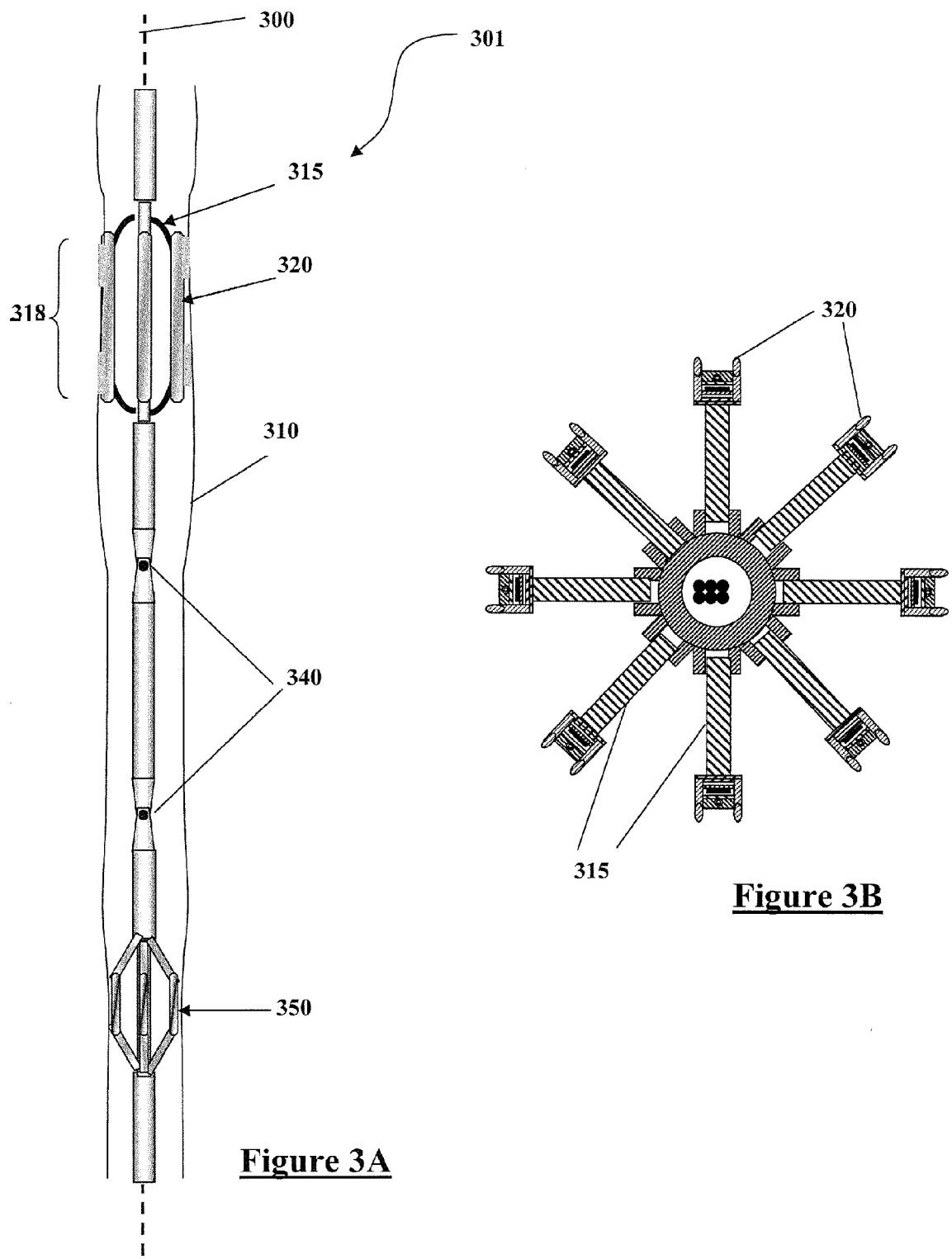
FIGS. 3A and 3B show multiple views of an expandable downhole tool in accordance with embodiments disclosed herein.

Referring now to FIGS. 3A and 3B, multiple views of a downhole logging tool 301 in accordance with embodiments disclosed herein are shown. FIG. 3A particularly shows a schematic view of an expandable wireline downhole tool 301. The tool 301 has a tool body disposed along axis 300, a sensor section 318 having sensor arms 320, (e.g., sleds) and an open/close mechanism 315. The open/close mechanism 315 may open and/or close to move the sensor arms radially with respect to the tool axis 300. The mechanism 315 may be passive, such as bow springs, active, such as motorized or hydraulic arms to push against the borehole wall 310, or a combination of the two. The mechanism may also be magnetic, as such embodiments described in U.S. patent application Ser. No. 10/104,320, herein incorporated by reference. As such, the open/close mechanism 315 may allow the sensor arms 320 to couple and be disposed adjacent to the borehole wall 310. The tool 301 may contain a transmitter assembly 350, of which several embodiments will be discussed below. Further, the downhole tool 301 may also contain connections 340, such as knuckle joints, to decouple the transmitter 350 and receiver tool sections 318.

As shown, the downhole tool 301 may include eight sensor arms (FIG. 3B). However, those having ordinary skill in the art will appreciate that, in other embodiments, the downhole tool may need only one or more sensor arms disposed therefrom. For example, at least four azimuthal arms are need for collated cross dipole and quadrupole logging. Preferably though, eight azimuthal sensor arms, as shown in FIG. 3B, are recommended for reliable monopole, dipole, and quadrupole logging.

Additionally, these sensor arms may be independently expanded and retracted (opened/closed), allowing for measurements at the borehole wall and the outer diameter of the tool. For example, the tool may contain eight sensor arms, but only four arms expand to the borehole wall surface. The remaining four sensor arms may then collect sensor information at or near the outer diameter of the tool.

Figures 4A, 4B:
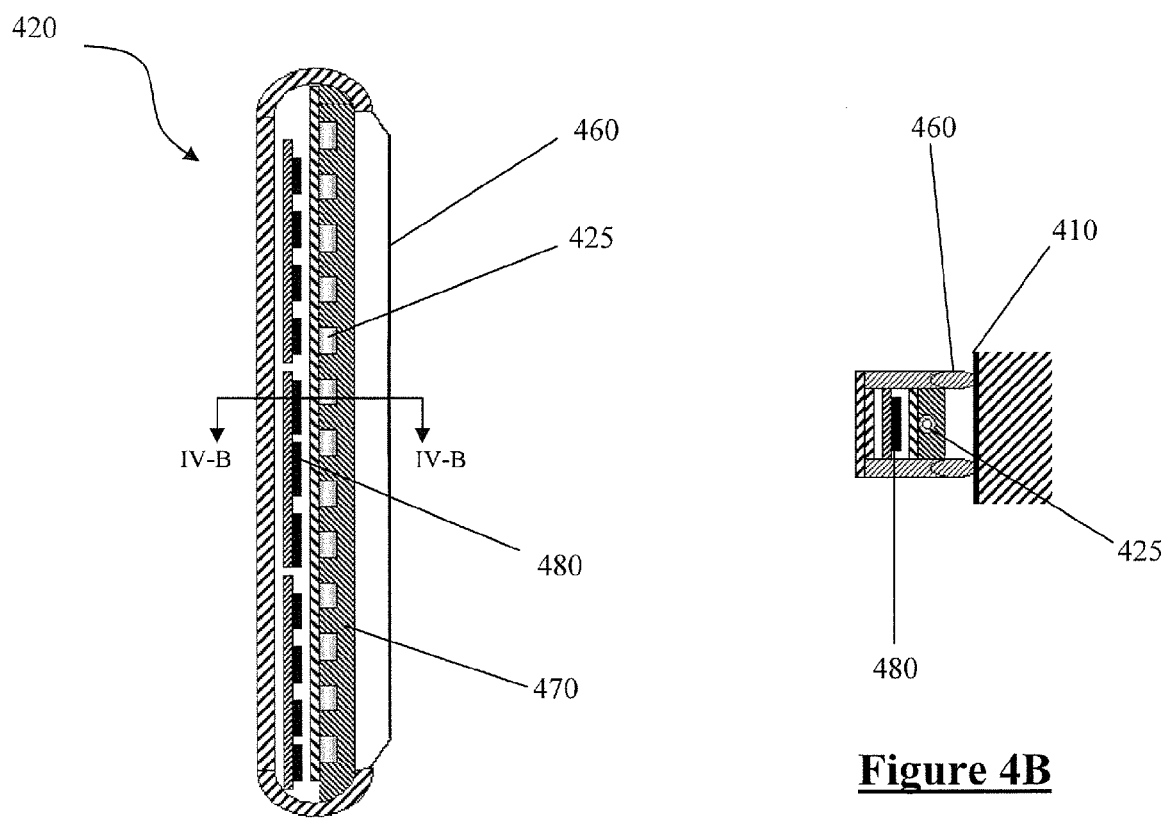
FIGS. 4A and 4B show multiple views of a sensor arm of an expandable downhole tool in accordance with embodiments disclosed herein.

Referring now to FIGS. 4A and 4B, a detailed view of a sensor arm 420 in accordance with the embodiments described herein is shown. Each sensor arm 420 may include one or more sensors 425 disposed herein. These sensors may be sound pressure transducers, such as piezoelectric hydrophones, optical pressure sensors, or any other type sensors known in the art. As shown in FIGS. 4A and 4B, a spacer 460 may be mounted to an outer surface of the arm 420, such as to maintain a space between the arm 420 and the borehole wall 410. The spacer 460 protects the sensor 425 from wearing out as the result of repeated contact with the borehole wall 410. The spacer 460 also facilitates a clean measurement at the sensors 420 by maintaining a controlled space between the sensor 425 and the borehole wall 410. The spacer shown in the embodiment of FIG. 4B is shaped to make contact with the borehole wall 410, and still maintain an empty space between the sensor 425 and the borehole wall 410. The arm 420 may also include a protective layer 470 disposed directly onto the sensor, such as Vitron or other similar product which is acoustically transparent. The protective layer 470 protects the sensor from exposure to drilling fluids and other environmental elements. Electronic systems 480 may be housed within the arm for the operation of the tool 420 and transport the sensor signals to the surface. The electronic systems 480 may be connected to, or part of, a signal transmission system, e.g. wires or fiber optics (not shown).

Figure 5:
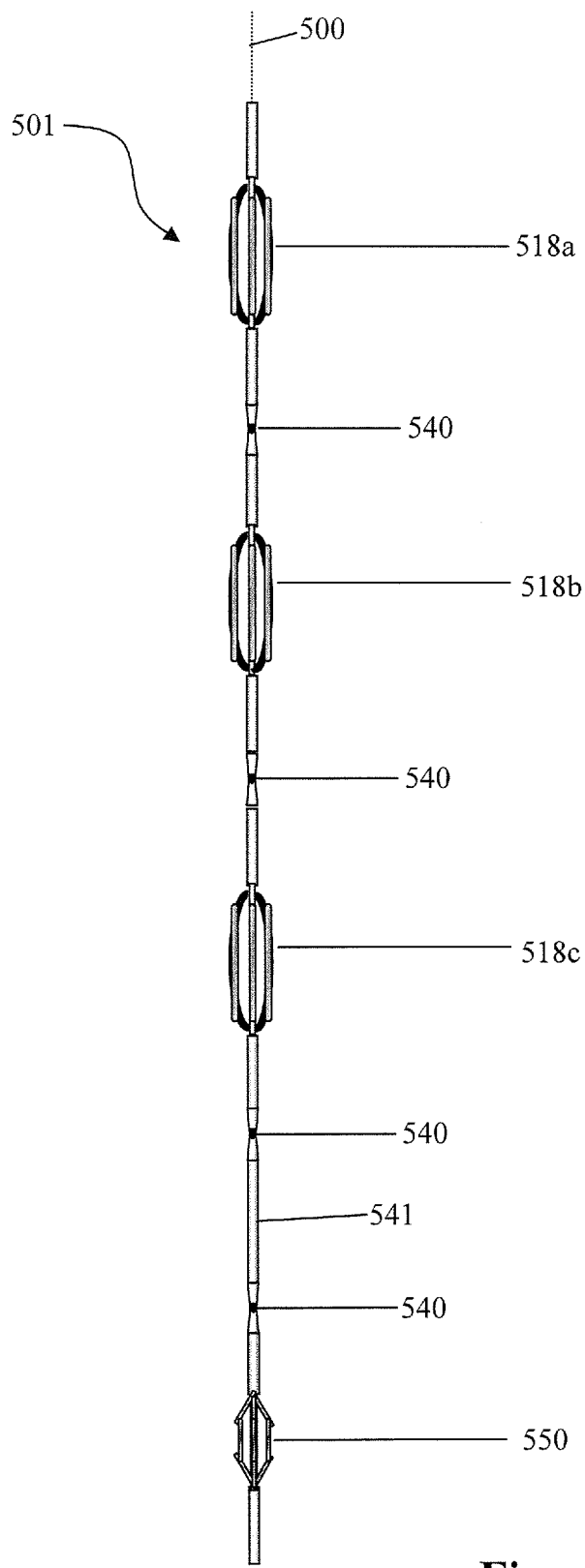
FIG. 5 shows a perspective view of an expandable downhole tool in accordance with embodiments disclosed herein.

Referring now to FIG. 5, a perspective view of an expandable downhole tool 501 in accordance with embodiments described herein is shown. In this embodiment, the expandable tool 501 includes multiple sensor sections 518a-c, each disposed along the tool axis 500. FIG. 3A illustrated an embodiment with only one sensor section 318; however, depending on the desired target measurements, multiple sensor sections 518a-c may be included with the tool 501. The tool 501 may also include a transmitter section 550. The transmitter section 550 communicates information about the wellbore to the sensor sections 518a-c. Configurations, such as shown in FIG. 5, may enable deep sonic imaging, such as sonic reflection measurements, and also may enable single well acoustic imaging or a single well or cross well seismic survey. By disposing the transmitter 550 deeper in the well relative to the sensors, and transmitting, the signal received by the sensor sections 518a-c may contain information about the borehole wall surface and other well properties.

Figures 6A, 6B, 6C:
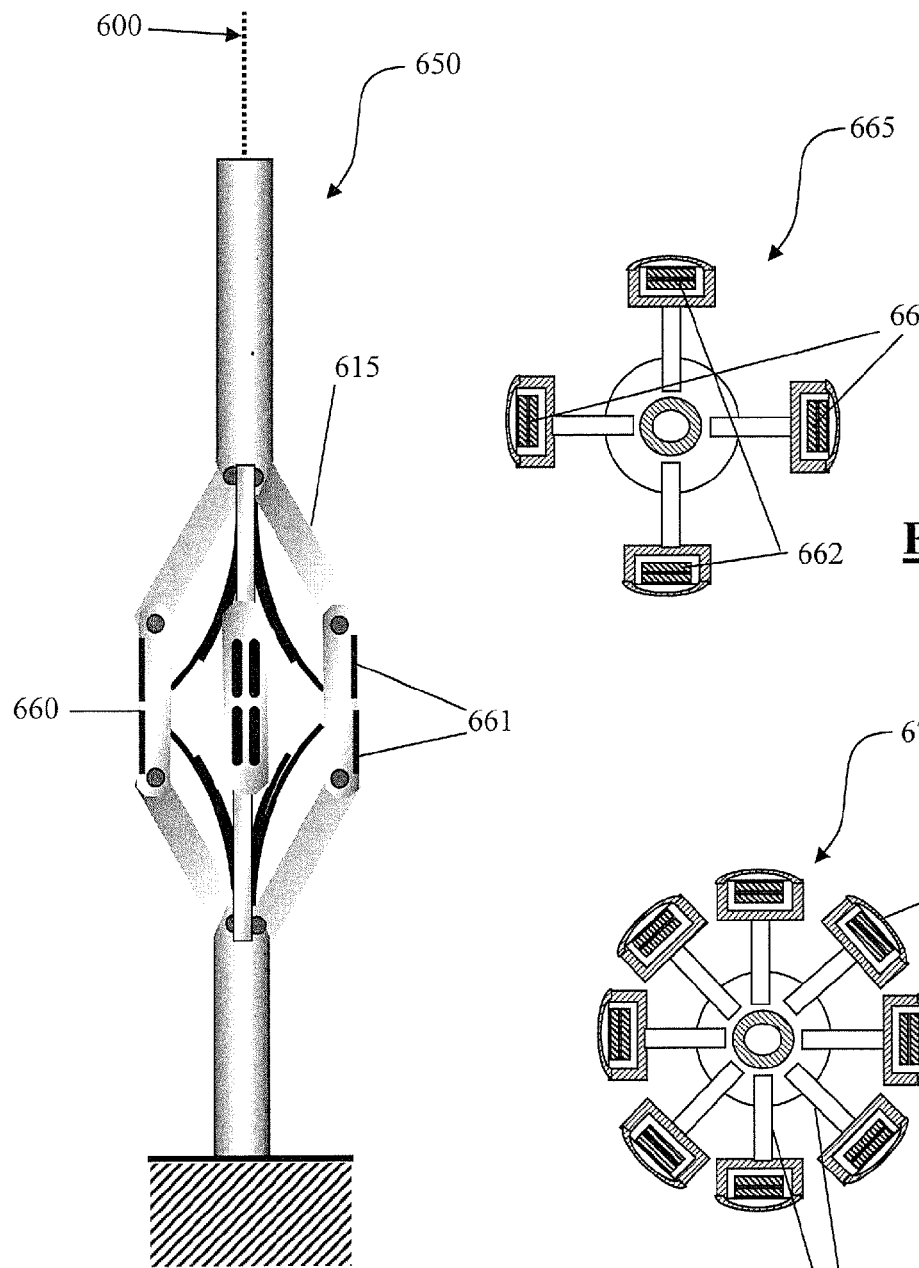
FIGS. 6A, 6B, and 6C show multiple views of transmitter section of an expandable downhole tool in accordance with embodiments disclosed herein.

Further, the connections 540, shown in FIG. 5, allow for relative positional changes of the sensor sections 518a-c and transmitter assembly 550. Additional sections 541 also may be added in different positions on the tool 501, such as between the sensor sections 518a-c and transmitter 550 sections. As such, this depends on the target measurements desired. Also, the connections 540 allow decoupling of the weight of the sensor sections 518a-c and transmitting section 550 in deviated borehole Referring now to FIGS. 6A-6C, a perspective view of an expandable transmitter section 650 in accordance with the embodiments described herein is shown. In this embodiment, the transmitter assembly 650 is a rigid expandable structure linked to a vibrational source 661 located within an arm 660. Similar to the sensor assembly in FIGS. 3A-3B, the transmitter assembly 650 may include expandable arms 660, in which each arm 660 may include an open/close mechanism 615. The mechanism 615 may expand and/or retract the arms 660 in a radial direction relative to the tool axis 600. As such, in this embodiment the expansion of the arms 660 facilitates mechanically transmitting vibrations directly into the formation via the borehole wall surface. For example, FIG. 6B shows a transmitter assembly 665 having four arms 661-662. In this embodiment, acoustic transmitters 661 may be used to generate a dipole pressure field. Also, the acoustic transmitters 662 may be used with transmitters 661 to provide collocated cross dipole fields or a quadrupole field. FIG. 6C shows an embodiment in which the transmitter section 670 includes eight transmitter arms 673. In this embodiment, all the transmitters 673 expanded by the open/close mechanism 615 may be activated simultaneously, which may be used to generate a pseudo-monopole field, or single source field.

Figure 7:
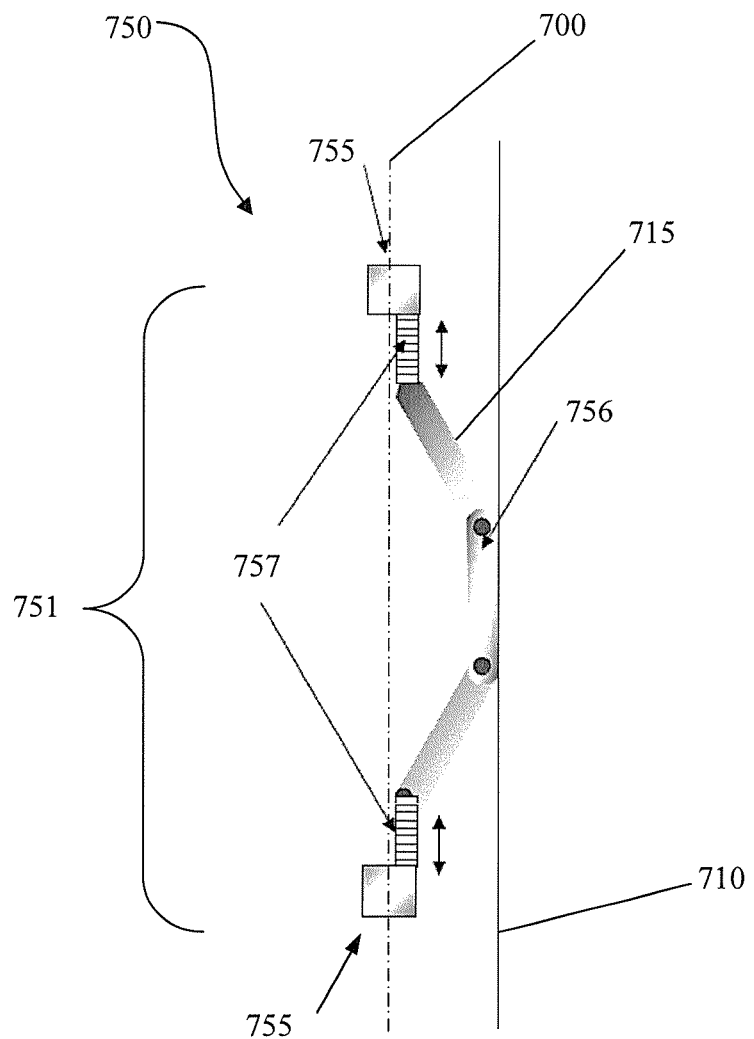
FIGS. 7A, 7B, and 7C shows multiple views of a transmitter section of an expandable downhole tool in accordance with embodiments disclosed herein.

Referring now to FIG. 7, a detailed view of the transmitter section in accordance with the embodiments described herein is shown. The transmitter assembly 750 may include the transmitter source 751 disposed within the tool body, while the arms 715 and pads 756 are manufactured out of vibration propagating media. For example, located in the tool body is a piezo stack 757 connected to a mounting block 755. The piezo stack 757 vibrates with an excitation signature supplied, by an electrical signal. The open/close mechanism 715 and expandable arms 756, made of vibration propagating media, transfer the vibrations to the borehole wall 710. Similar to previous embodiments, the current embodiment may contain anywhere from two to eight or more independent arms, depending on the target measurement.

Embodiments disclosed herein may provide for one or more of the following advantages. First, embodiments disclosed herein may provide for greater sonic sensitivity due to eccentering issues. For example, the expandable arms, or sleds, in the sensor and transmitter assembly embodiments may facilitate alignment of the axis of the expandable tool with the center axis of the borehole wall. Next, embodiments described herein may allow for different diameter borehole size coverage. Additionally, embodiments disclosed herein may allow for greater transmitter to formation coupling, resulting in greater monopole, dipole, collocated cross dipole, quadrupole, and torsional mode efficiencies.

Furthermore, it should be understood by those having ordinary skill that the present disclosure shall not be limited to specific examples depicted in the Figures and described in the specification. As such, various mechanisms may be used to expand the arms to the borehole wall without departing from the scope of the present disclosure. While the present disclosure has been described with respect to a limited number of embodiments, those skilled in the art, having benefit of this disclosure, will appreciate that other embodiments may be devised which do not depart from the scope of the disclosure as described herein. Accordingly, the scope of the invention should be limited only by the attached claims.

What is claimed is:

1. A downhole tool, comprising:
a tool body having a central axis;
a sensor section comprising:
   a plurality of sensor arms connected to the tool body, each of the plurality of sensor arms movable in a radial direction with respect to the axis of the tool body, each of the plurality of sensor arms independently expandable and retractable in the radial direction with respect to tool body;
   an open/close mechanism;
   a sensor disposed on each of the plurality of sensor arms; and
   a spacer disposed adjacent to the sensor, the spacer being designed to form an empty space between the sensor and a downhole wall; and
a transmitter section disposed on the tool axially spaced from the sensor section, and which does not overlap with the sensor section and is configured to transmit acoustic energy to a formation for communicating information about the downhole wall to the sensor section,
   wherein the transmitter section comprises a vibrational source disposed within the tool body, and a transmitter assembly comprising vibration propagating media such that acoustic energy generated by the vibrational source is propagated through the transmitter assembly to the formation.

2. The downhole tool of claim 1,
wherein each of the plurality of sensor arms is connected to the tool body with an open mechanism and configured to move in a radial direction with respect to the axis of the tool body.

3. The downhole tool of claim 2, wherein each of the plurality of sensor arms has a plurality of sensors attached thereto.

4. The downhole tool of claim 2, wherein the vibrational source generates monopole field.

5. The downhole tool of claim 2, wherein the vibrational source generates a multi-pole field.

6. The downhole tool of claim 2, wherein the vibrational source generates a torsional field.

7. The downhole tool of claim 1, further comprising a plurality of sections, each of the plurality changeable along the central axis of the tool with respect to each other, wherein the sensor is disposed on one of the plurality of sections and the vibrational source is disposed on another of the plurality of sections.

8. The downhole tool of claim 1, wherein the vibrational source and sensor are acoustic.

9. The downhole tool of claim 1, wherein the plurality of sensor arms includes at least eight sensor arms.

10. The downhole tool of claim 1, further comprising a connection for allowing relative positional changes for the sensor section and the transmitter section.

11. A method of logging a formation downhole, the method comprising:
disposing a tool downhole, the tool having an axis defined therethrough and a transmitter assembly comprising vibration propagation media,
moving at least one of a plurality of sensor arms attached to the tool in a radial direction with respect to the axis of the tool body via an open/close mechanism, each of the plurality of sensor arms independently expandable and retractable in the radial direction with respect to the tool body;
transmitting a signal with a vibrational source disposed within the tool into the formation, wherein the vibrational source is acoustically coupled to the formation by the transmitter assembly such that the signal generated by the vibrational source is propagated through the transmitter assembly to the formation; and
receiving the signal with a sensor disposed upon one of the plurality of sensor arms of the downhole tool, the sensor being disposed on the tool axially spaced from the transmitter assembly for communicating information about a downhole wall to the sensor, the sensor forming an empty space between the sensor and the downhole wall.

12. The method of claim 11, wherein the transmitter assembly further comprises a transmitter arm configured to move in a radial direction with respect to the tool body axis.

13. The method of claim 11, wherein each of the plurality of sensor arms has a sensor disposed thereon.

14. The method of claim 11, wherein the tool further comprises a plurality of sections, each of the plurality changeable along the central axis of the tool with respect to each other, wherein a sensor is disposed on one of the plurality of sections and the vibrational source is disposed on another of the plurality of sections.

15. The method of claim 11, wherein the plurality of sensor arms includes at least eight sensor arms;
wherein moving at least one of the plurality of sensor arms in the radial direction further includes moving only four of the sensor arms.

16. A method of manufacturing a downhole tool, the method comprising:
attaching a plurality of sensor arms and a transmitter assembly comprising a transmitter arm onto a tool body, the tool body having an axis defined therethrough, such that the transmitter arms are configured to move in a radial direction with respect to the axis, and each of the plurality of sensor arms independently moveable in the radial direction with respect to the axis,
disposing a sensor on at least one of the plurality of sensor arms,
disposing the transmitter assembly on the tool axially spaced from the plurality of sensor arms for communicating information about a downhole wall to the sensor,
disposing a spacer adjacent to the sensor with an empty space between the sensor and the downhole wall, and
disposing a vibrational source within the tool body, wherein the transmitter assembly is further comprised of vibration propagation media such that when the downhole tool is deployed and in use acoustic energy generated by the vibrational source propagates into a formation via the transmitter assembly.

* * * * *